US005662820A

United States Patent [19]
Schwiete et al.

[11] Patent Number: 5,662,820
[45] Date of Patent: Sep. 2, 1997

[54] WELDING PROCESS FOR DRAWN ARC STUD WELDING

[75] Inventors: Bernd Schwiete, Witten; Ulrich Citrich, Gevelsberg; Madsak Jurgen, Breckerfeld, all of Germany

[73] Assignee: TRW Inc., Cleveland, Ohio

[21] Appl. No.: 614,300

[22] Filed: Mar. 12, 1996

[30] Foreign Application Priority Data

Mar. 14, 1995 [DE] Germany .................... 19509172

[51] Int. Cl.⁶ .................................. B23K 9/20
[52] U.S. Cl. .............................. 219/99; 219/98
[58] Field of Search .......................... 219/98, 99

[56] References Cited

U.S. PATENT DOCUMENTS

| | | | |
|---|---|---|---|
| 3,496,325 | 2/1970 | Glorioso | 219/98 |
| 4,456,808 | 6/1984 | Wilkinson et al. | 219/98 |
| 4,797,529 | 1/1989 | Schmitt et al. | 219/98 |
| 5,171,959 | 12/1992 | Schmitt et al. | 219/98 |

FOREIGN PATENT DOCUMENTS

| | | |
|---|---|---|
| 0241249 | 10/1987 | European Pat. Off. . |
| 3130389 | 2/1983 | Germany . |
| 54-025247 | 4/1979 | Japan . |
| WO96/10468 | 4/1996 | WIPO . |

Primary Examiner—Clifford C. Shaw
Attorney, Agent, or Firm—Fay, Sharpe, Beall, Fagan, Minnich & McKee

[57] ABSTRACT

The invention relates to a welding process for drawn arc stud welding wherein after ignition of the main current electric arc, the latter's voltage (U) is measured and, depending upon the measured voltage, the current flow of the continued main current electric arc and/or the dipping movement of the parts which are to be welded together, is regulated or controlled.

20 Claims, 2 Drawing Sheets

WELDING PROCESS FOR DRAWN ARC STUD WELDING

BACKGROUND OF THE INVENTION

The subject invention is directed to a welding process for drawn arc stud welding, as well as a drawn arc stud welding device for execution of the process.

In the well known drawn arc stud welding process, the part which is to be welded together with a work piece is initially placed on the work piece by means of a welding head, which can be designed as a stud welding gun. After switching on a pre-sparking or pilot current of approximately 10 to 100 A, the part is lifted off the work piece, so that a pilot electric arc is formed. Following the drawing of the pilot electric arc, the amperage is increased by a multiple up to the current level for the main current electric arc (I>100 A). After ignition of the main current electric arc, and following observance of a predetermined welding waiting time, the part is moved toward the melted work piece surface and plunged into the melted puddle. After plunging, the welding current is turned off and welding is finished.

In practical application, however, it has been shown that with stud welding, weldings of unsatisfactory quality occur particularly when there are impurities on the surfaces of the parts which are to be welded together. This involves mostly oil or grease residues on the work piece, which may, for example, be sheet plate produced by a drawing process, that is coated with a drawing lubricant.

Furthermore, similar problems occur with welding of coated, for example galvanized, parts. The presence of rust or a primer on the surfaces to be welded can likewise result in detrimental influences on the welding quality.

Therefore, it has also been known for quite some time to superimpose on the pilot arc pulses with high peak current intensities, in order to burn off impurities which may be present on the surfaces of the parts which are to be welded together (see, for example, U.S. Pat. No. 3,496,325).

It was, however, considered as a drawback, that the purification pulses were activated either manually or automatically with each welding, independent of the quality of the surfaces to be welded together.

For that reason, the control device for stud welding described in European Patent EPO 241 249 was developed. A pilot arc monitoring voltage is converted to a correction voltage by means of a set-point comparator and is superimposed on a control voltage for principally controlling a high-frequency modulated switching mode power supply unit, in accordance with the thus corrected control voltage, that adjusts its output current during the respective welding operation to the resistance value of the pilot arc as established by the monitoring voltage. In this fashion, recognition of the quality of the surfaces to be welded is achieved through measuring of the voltage of the pilot arc (as was already known from German Patent 3130389C2). Thereafter, cleaning of surfaces can be obtained through an increase of the pilot current for a given period of time.

This process in essence is based upon the teaching from German Patent 3130389C2, that a heavily soiled, for example greasy surface, exercises a clearly measurable influence upon the voltage of the pilot arc, while the voltage of the main current electric arc remains practically unaffected thereby.

Since with these known welding processes the attained quality of the finished welding is to be appraised based on the voltage of the pilot arc, relative uncertainty results in the evaluation of the obtained welding quality, inasmuch as it is true that inadequately prepared or soiled surfaces are being recognized, but it is not possible to control the actually achieved improvement through altering of the welding current (pilot current—and/or the main current electric arc) and/or the activation of purification pulses.

Proceeding from the above-discussed state of the art, the invention is based on the objective to create another welding process for drawn arc stud welding, which makes it possible to recognize inadequately prepared surfaces to be welded and which reduces, through appropriate measurements, their impact upon the quality of the finished welding. In addition, the invention is directed to a device for the execution of the process.

SUMMARY OF THE INVENTION

Inadequately prepared or soiled surfaces are identified in the process according to the invention by measuring the voltage of the main current electric arc. The impact of such surfaces upon the finished welding is reduced through appropriate control or regulation of the current flow of the main current electric arc.

The invention proceeds from the knowledge, contrary to the previously held opinion (German Patent 3130389C2), that inadequately prepared or soiled surfaces also exercise an influence on the voltage of the main current electric arc, to an extent that the same can be reliably measured by test methods and evaluated according to the invention.

In one specific embodiment of the invention, the mean voltage over a brief time interval is measured immediately after the ignition of the main current electric arc, and dependent thereon, the current flow of the continued main current electric arc and/or the plunging movement of the parts which are to be welded, are regulated or controlled.

Taking a measurement of the mean voltage results in the advantage of higher accuracy and reproducibility of the measured value. Needless to say, in taking such measurements, the time interval during which the mean voltage is determined, for instance through scanning of voltage in equal intervals, must be short enough so that there remains sufficient time for influencing the continued main current electric arc, without, however, excessively high welding times resulting therefrom.

In the preferred specific embodiment of the invention, an initially predetermined flow of the main current electric arc is altered upon exceeding or failing to reach a predetermined threshold voltage value, through measuring of mean voltage. The change of the initially predetermined flow is preferably made dependent upon the deviation rate of mean voltage from the previously set threshold voltage value.

In the preferred specific embodiment of the invention, upon exceeding the threshold voltage, the main current is increased by an adequate amount for the duration of a purification pulse with steep pulse flanges (positive pulse) or reduced (negative pulse) or initially reduced, subsequently increased to a higher value in comparison with the initial value, and at the end of the period, the negative/positive purification value is reduced once again to the initial value, in order to bring about by the thereby produced excess voltage, a purification of the surfaces which are to be welded together. In so doing, it turned out that a positive edge of the welding current is particularly suitable for cleaning the surfaces which are to be welded together.

Instead of the negative/positive pulse, a positive/negative pulse can also be employed, where the current is initially increased, subsequently lowered and finally increased again to the initial value.

After generating a purification pulse, the mean voltage of the main current electric arc is preferably measured once again in order to determine whether the desired cleaning effect was attained in adequate measure. If an excessively high mean voltage of the main current electric arc is detected, the same as before, the process of generating a purification pulse with subsequent renewed control of the main current electric arc voltage is repeated until the mean measured voltage is below the threshold voltage value or until a previously determined number of purification pulses has been reached.

This process guarantees the benefit that the energy contents of a single purification pulse, even with heavily soiled surfaces, can be kept relatively small. An excessive impairment of the flow of the main current electric arc or the welding process can thus definitely be avoided.

If the predetermined number of purification pulses has been reached, with the mean voltage of the main current electric arc, measured after the last pulse, positioned below the pre-established threshold voltage value, then the welding process is preferably continued, inasmuch as based on the initially already relatively high current of the main current electric arc, a melting start of the surfaces which are, to be welded together has already taken place.

Additionally, in cases like this, a warning signal can be produced, or the welding process can be recorded with a corresponding error registration. This results in the advantage that with welding on the same work piece, or with comparable work pieces, appropriate statistical data can be obtained through simple evaluation of the protocol, and, separately from this, suitable measures can be undertaken such as pre-cleaning of surfaces or changes in the welding parameters. The protocol, naturally, can also be kept by memory storage of measured values or data derived from said values.

In one specific embodiment of the invention, in order to achieve the highest positive edge, it is possible automatically select either a positive or negative purification pulse, whereby a positive purification pulse is produced if a pre-set initial main welding current lies below a predetermined value, and a negative purification pulse, if the predetermined initial main welding current lies above a predetermined value.

A negative/positive or a positive/negative purification pulse can, needless to say, also be employed independent from an initial main welding current. Thereby, the bottom current value, with a positive/negative purification pulse, is limited by the bottom limitation of the range for the main welding current of the main welding current source, which frequently is designed separately from the current source for generating the pilot arc current.

In the preferred specific embodiment of the invention, the flow of the main current electric arc is corrected subject to the number and the positive or negative energy contents of the purification pulses and, if necessary, energy contents contained in time segments between two purification pulses. This will guarantee that the energy contents of the actually executed welding process will not exceed, or fall short of, in an excessively high manner, the energy contents according to the originally pre-set welding parameters and/or the preset welding curve.

In the simplest case, correction can be made in that the amperage of the main current electric arc, following completion of the purification pulses, with constant duration of the main current electric arc, is increased or lowered, or the duration of the main current electric arc, with constant current intensity of the main current electric arc, following completion of the purification pulse, is lengthened or shortened.

In one specific embodiment of the invention, the main current electric arc, by taking a single or multiple measurement of the mean voltage can be ignited by means of a constant initial current intensity, which is independent of the subsequent current intensity of the main current electric arc. This results in the benefit that with fixed ceiling—and/or bottom limitations for the current intensity of a purification pulse, there is produced the same height of pulse edge, which, essentially, is responsible for the intensity of the cleaning effect. In addition, there is the advantage that the threshold voltage need not be adapted to varying initial current intensities of the main current electric arc, which, basically, would be possible, for instance through the employment of an appropriate characteristic curve.

In the preferred specific embodiment of the process according to the invention, there is derived, from the deviation of the last measured mean voltage of a nominal voltage, a value or, in general, some information relative to the quality of the finish welding.

This results in the benefit that following execution of surface cleaning, the effectiveness of this measure can be checked and insofar as other known processes are concerned, a more reliable statement can be made regarding quality of the finished welding.

Said value is preferably shown on a display which is visible to the operator of the welding apparatus. Naturally, it can also be recorded instead or in addition as a value pertaining to the respective welding.

Additional specific embodiments of the invention result from the dependent claims.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 1:
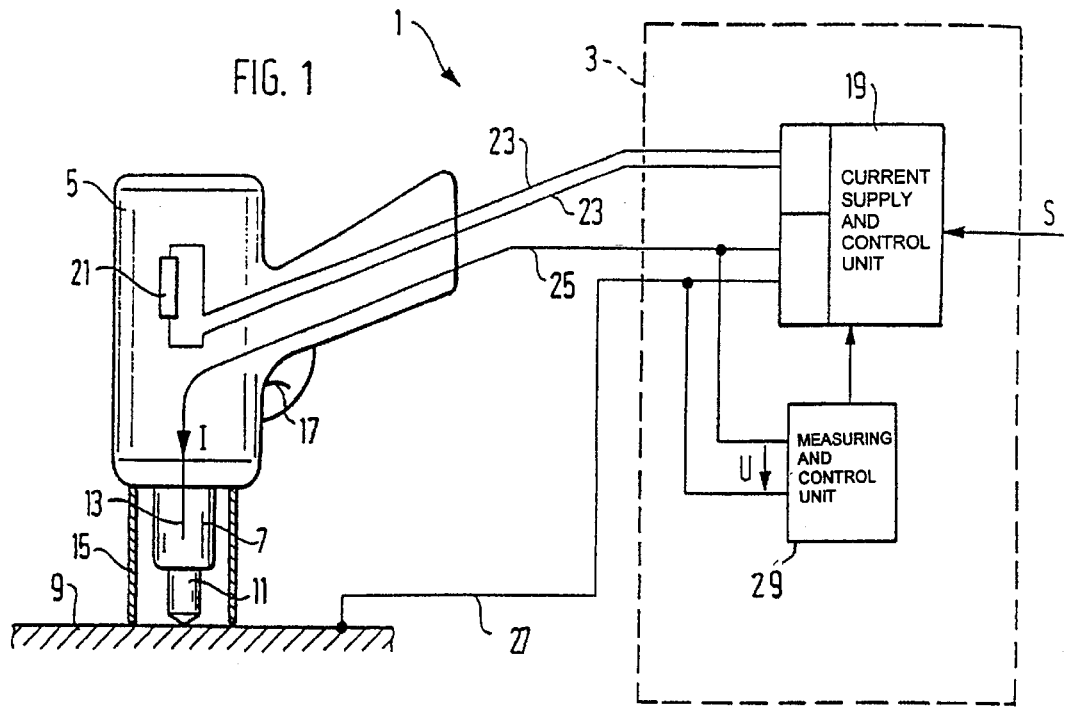
FIG. 1 is a schematic illustration of a stud welding device.

Referring now to the drawings wherein the showings are for the purposes of illustrating the preferred embodiment of the invention only and not for purposes of limiting same, the stud welding device 1, illustrated in FIG. 1 is comprised of a control apparatus 3 connected with a stud welding head 5 which, as shown in FIG. 1, can be designed as a stud welding pistol of any of a variety of known types.

The stud welding head 5 has in its anterior region a stud holder 7, in which is held a stud 11, which is to be welded to a work piece 9, and which is connected with a first electrode 13, supplying welding current. The stud holder 7 with stud 11 held therein, is arranged within a cylindrical pipe 15, which on the one hand serves as a limit stop for positioning the weld head 5 on the surface of the work piece 9, and, on the other hand serves as a guard against contact with the electrically live components.

For execution of a stud welding process according to the drawn arc stud welding process, the stud, after placement of welding head 5 on the surface of the work piece 9 and switching on of pilot welding current I, is lifted off the work piece surface by means of the stud holder 7, so that an electric arc with relatively low intensity (Up to approximately 100 A)—the so-called pilot arc—is drawn. For supplying the pilot welding current I, the stud welding head 5, designed in form of a stud welding gun has a trigger 17, which closes, for example, a switch (not shown). The closing of the switch is detected by a current supply and control unit 19 of control apparatus 3, via control lines (not shown) between the stud welding head 5 and the control apparatus 3.

After detecting the start signal for a stud welding process, the stud holder 7 with stud 11 is lifted off work piece 9 by means of a solenoid 21 arranged in the stud welding head. To that end, the current supply and control unit 19 is connected with the stud welding head via connecting lines 23.

Prior to activating the solenoid 21 by the current supply and control unit 19, immediately after generating the starting signal S, the pilot current I is switched on by the trigger 17. Current I initially flows from the current supply and control unit 19 through a path including first electrode line 25, stud 11, work piece 9, second electrode line 27, and back to the origin of the current supply and control unit 19. This generation of the pilot arc thus occurs in known fashion.

The current supply and control unit 19 of the control apparatus 3 comprises all necessary components for generating, controlling and regulating the welding current. In addition, the current supply and control unit 19 contains, needless to say, components for setting and storing of welding parameters, welding curves and when necessary, a memory for the registration of data concerning one or several welding processes.

In addition, the control apparatus 3 includes a measuring and control unit 29, for taking measurements of and for evaluation of the U-voltage of the arc during a welding process, which homes in on the current supply and control unit 19 in the subsequently described manner and which cooperates with same. In the simplest case, for measuring of the electric arc voltage, the U-voltage can be collected at the origin of the current supply and control unit 19, connected via electrode lines 25 and 27, and can be supplied to the measuring and control unit 29. In this instance, the measuring and control unit 29 can naturally also measure the U-voltage at times outside of a welding process, so that in this manner hazardous voltages and voltages caused by malfunction of the apparatus, can be detected by the operator. In such case, the measuring and control unit 29 can home in on the current supply and control unit 19, so that an emergency shut-off of the entire control apparatus 3 will occur, or at the very least, a shut-off of the welding start of the current supply and control unit 19.

Figure 2A:
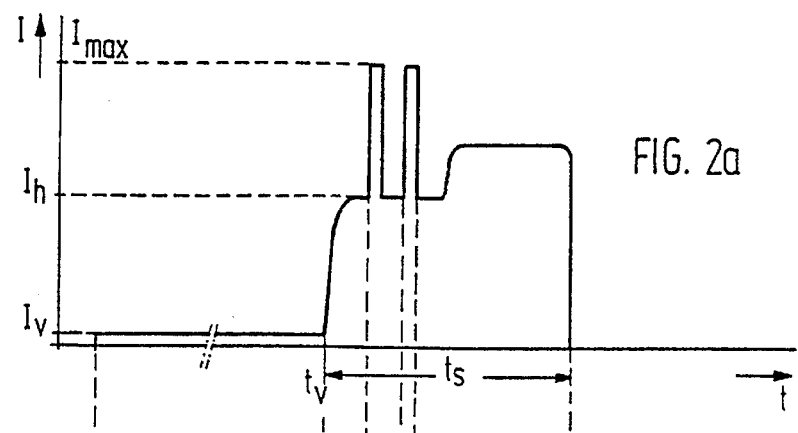
FIGS. 2a–2b are diagrams with curves showing the welding current and the arc voltage during welding, pursuant to a first specific embodiment of the welding process in accordance with the invention.
Figure 3A:
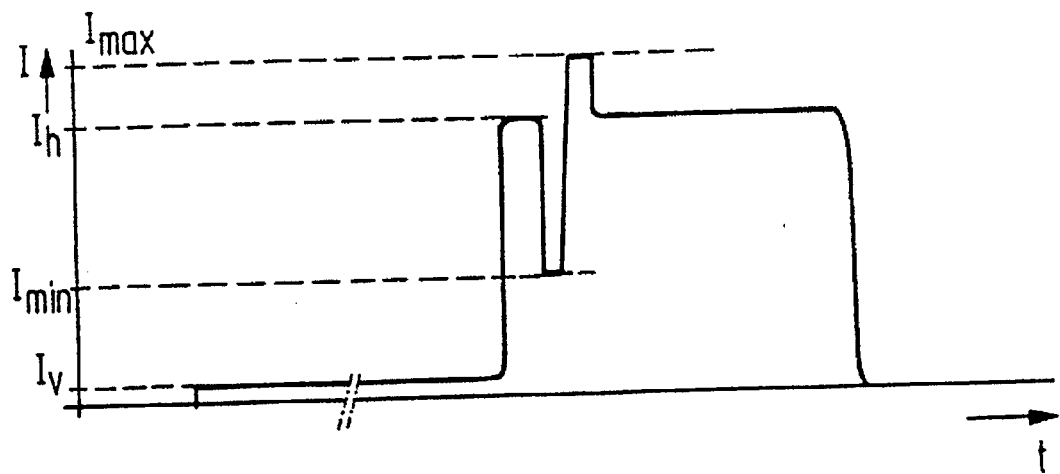
FIGS. 3a–3b are diagrams with curves showing the welding current and the arc voltage during welding according to another specific embodiment of the stud welding process in accordance with the invention.

The task of the measuring and control unit 29 begins only after the initial main welding current I has been on longer than time $t_v$, in other words after expiration of the pilot time, or after the start of the main welding process (FIG. 2a or FIG. 3a).

After turning on the main current electric arc with the initial main welding current I, and after waiting for a response time, during a measuring time interval 'Delta $t_m$', a measurement is taken of the relevant voltage U of the main current electric arc. In order to increase the measuring accuracy and to improve the reproducibility of the measurement taking, the voltage is averaged $U_{avg}$ during the measuring time interval 'Delta $t_m$'. Inasmuch as it is necessary in order to evaluate the measured voltage U to carry out an analog/digital conversion of the measured voltage values, by means of a customarily employed microprocessor, the formation of the mean voltage through scanning of voltage U of the main current electric arc can be done in several equally spaced time intervals and the average value can be established through simple mathematical operations by the microprocessor.

Since the path of the electric arc is to be influenced independent of the measured voltage values, and since the entire main welding process from start of the main current electric arc until the plunging of the stud into the melted area of the work piece lasts only a few milliseconds to some 10 milliseconds, the current supply and control unit 19 must have a welding current source which will guarantee upon switching on the main welding current I or when changing the main welding current I, an extremely high edge steepness.

Inasmuch as the voltage U of the main welding electric arc, according to the knowledge on which the invention is based, permits reaching a conclusion with respect to the surface condition of the parts that are to be welded together, specifically with respect to the work piece, it is possible, following the first initial measurement of the voltage of the main current electric arc U, to adapt the continued main welding process, through targeted influence upon the main welding current I, to the surface conditions of the work pieces which are to be welded together.

Thus, for instance, with upward deviation of actual voltage U of the main current electric arc from a pre-set threshold voltage value $U_s$, the welding time $t_s$ can be extended and/or the main welding current I increased, since, in comparison to a case of ideally prepared surfaces, the increased voltage U of the main current electric arc points to contamination of surfaces or coating of surfaces.

Likewise, with falling short of a threshold voltage adapted to average permissible contamination, there may also be a shortening of the welding time $t_s$ and/or delay in the main welding current.

Naturally, measurement of the main current electric arc can be repeated several times or can take place quasi-continuously and subject thereto, the current intensity and/or the duration of the main current I electric arc or the current path of the current intensity can be altered.

With the preferred specific embodiment of the process according to the invention pursuant to FIG. 2, when detecting vis-a-vis a threshold voltage $U_s$, an increased voltage (average voltage) a purification pulse can be superimposed on a pre-set course of the main current electric arc. To that end, as indicated in FIG. 2a, immediately after completion and evaluation of measurement taking of voltage U of the main current electric arc, the main welding current I with an extremely steep edge is increased after its start, to an extremely high value, preferably to the maximum value $I_{max}$ which can be supplied by the current supply source (or the pre-set subsequent higher welding current at the welding apparatus), and thereafter immediately brought again down to an initial value $I_h$ of the main welding current I. In so doing, the steep edges, specifically the positive edges of the purification pulses produce an excess voltage, which scatters, explosion-like, in all directions, the dirt particles which are present on the surfaces.

Figure 2B:
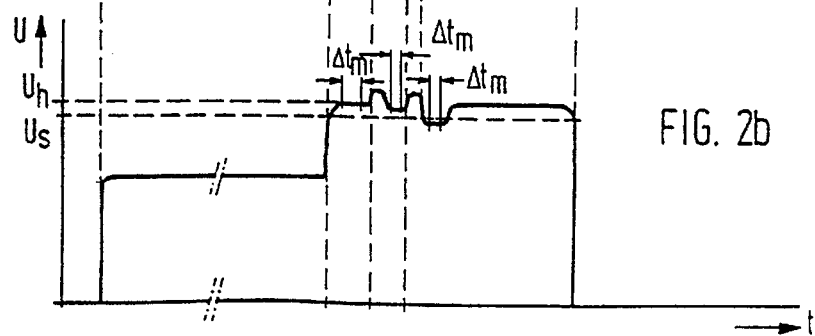

FIG. 2b indicates that after completion of the first purification pulse, the measured average voltage of the main current electric arc U, which was again taken during a subsequent time interval 'Delta $t_m$', did, in fact decline compared with the originally measured value, but still lies above the pre-set threshold voltage value $U_s$. With the illustrated welding process, the conclusion can be reached that the surfaces, which are to be welded together still have an excessively high dirt level.

Accordingly, after the second measurement of voltage U of the main current electric arc, a new purification pulse is ignited.

During the third measuring of the voltage U of the main current electric arc, which was done after the above purification pulse, adequate surface quality was detected, since the measured voltage was below the threshold voltage $U_s$. Thus, the remaining portion of the main welding process could be continued and completed with the higher current intensity illustrated in FIG. 2a. This increase of the main welding current intensity, done only after completion of any required purification pulses, has the advantage in that during the time when the surfaces are being cleaned, there will take place only minor melting of the surfaces, as a result of which, impurities can be more easily removed by the excess voltage of the purification pulses than when the impurities have already been trapped in the melted mass.

The superimposition of purification pulses is preferably terminated if, as illustrated in FIG. 2, the voltage U of the main current electric arc, measured after the last purification pulse, lies below the pre-set threshold and/or if a pre-established maximum number of purification pulses has been reached. In the latter case, the welding process is preferably completed even if the last measured voltage of the main current electric arc still lies above the pre-set threshold since interruption of the welding process may result in difficulties when undertaking a new welding process. Moreover, despite the measured "impermissibly high" voltage value of the main current electric arc, there might be produced a welding with adequate stability.

Taking measurement of the voltage after completion of the last purification pulse has the advantage, compared with known processes, that the cleaning effect of the pulses can actually be checked and thus there is a higher accuracy in the statement regarding the quality of the finished welding.

Figure 3B:
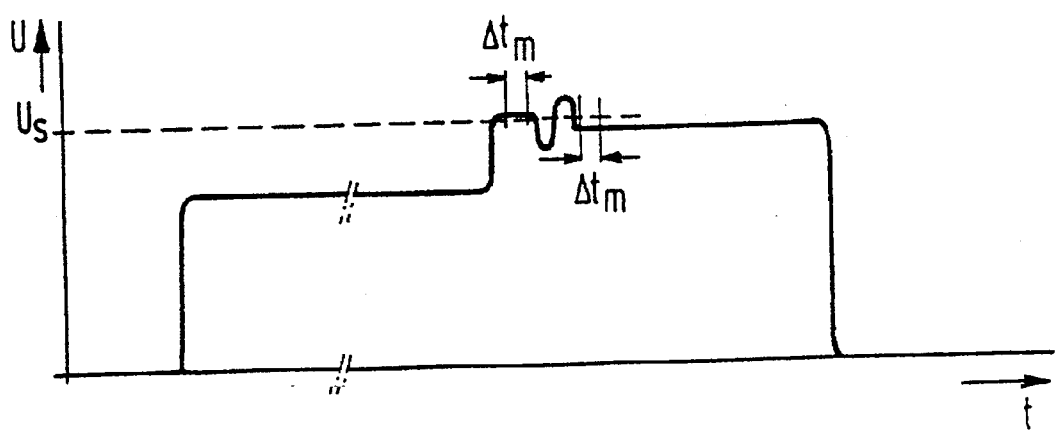

As indicated in FIG. 3, the purification pulse can naturally also be carried out in that instead of the positive purification pulses shown in FIG. 2a, the current of the main current electric arc is at first lowered from an initial value $I_h$ to the lowest possible value $I_{min}$, subsequently, it is immediately increased to a maximum possible value of $I_{max}$ and after that, it is again reduced to the initial value. As a result of such negative/positive purification pulses, the advantage of a significantly higher positive edge is achieved, which contributes to a higher excess pressure and thus to a better cleaning effect. It is also possible to employ a purely negative cleaning pulse or a positive/negative cleaning pulse (at first increase to a higher, then reduction to a lower and finally return to the original value). It turns out, however, that a positive edge with a maximum possible height has achieved better cleaning effect vis-a-vis an equally high negative edge.

Since in the welding process illustrated in FIG. 3, the voltage U measured after the single purification pulse of the main current electric arc, was already below the pre-set threshold voltage $U_s$, it was possible to complete the welding process without performing additional purification pulses.

Inasmuch as both through the purification pulses (at least during their positive segments) as well as during the time intervals 'delta $t_m$', compared with a welding process where no cleaning pulses or measurement-taking is performed, the main current electric arc is supplied with additional energy, this circumstance is taken into consideration during the following part of the welding process, by providing corresponding correction. To that end, there exists for instance the opportunity to determine the additional energy compared with a welding process without purification pulses (only one single measurement is needed for the main current electric arc voltage during a one time interval 'delta $t_m$'), up to completion of the last measurement-taking of the main current electric arc voltage and, on the basis thereof, to influence the further course of the main welding process.

In the simplest specific embodiment, the further course of the main welding process could, for example, be influenced in such a way that the energy contents of the actually performed welding process would basically agree with the energy contents of an ideal welding process or would only be slightly higher, since a given energy content was necessary for the removal of the impurities. The energy content of the ideal welding process could for instance be ascertained by calculation of the energy content of a welding process without a purification pulse, in such manner that the ideal current course (which is maintained through control of the welding current) is multiplied with the ideal voltage course, and from said chronological course of performance, the energy contents is determined through integration.

By way of the voltage course, the first measured voltage value can be determined, taking into account the known functional dependency of the welding voltage upon welding current, or, the voltage can be continuously measured with the measuring and control unit 29.

In the simplest case, the additional energy content which was ascertained in the above described manner, can be corrected by reduction or extension of welding time or by increasing or lowering the main welding current to the remaining welding time or any combination of the above.

Thus, the invention provides, with minor hardware expense, a realizable possibility for automatic adaptation of welding parameters or of the entire welding process to varying conditions of surfaces that are to be welded together.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A welding process for drawn arc stud welding wherein:
   a) after ignition of a main current electric arc, a voltage (U) is measured and
   b) depending upon the measured voltage (U), at least one of the course of the current of the continued main current electric arc and the movement of parts which are to be welded, is regulated or controlled.

2. A process according to claim 1 wherein an average voltage ($U_{avg}$) is measured during a brief time interval (delta $t_m$), immediately after the ignition of the main current electric arc wherein depending on the measured average voltage ($U_{avg}$) at least one of the course of the current of the continued main current electric arc and the movement of the parts which are to be welded, is regulated or controlled.

3. A process according to claim 1 wherein, with at least one of surpassing of and failing to meet a pre-set threshold voltage value, a pre-set course of a main welding current (I) is altered through one of the measured voltage (U) and measured average voltage ($U_{avg}$).

4. A process according to claim 3 wherein the alteration takes place depending upon the rate of deviation of the measured average voltage ($U_{avg}$) from a threshold voltage value ($U_s$).

5. A process according to claim 3 wherein, with surpassing of a threshold voltage ($U_s$) by one of the measured voltage (U) and measured average voltage ($U_{avg}$), the main welding current (I) is superposed with a purification pulse, the purification pulse being at least one of a positive pulse with steep pulse edges, and a negative pulse which is reduced from an initial value and is subsequently increased and, at the end of the duration of the purification pulse, is again reduced to the initial value, in order to bring about cleaning of surfaces of the parts that are to be welded together.

6. A process according to claim 5 wherein following a purification pulse, one of the measured voltage (U) and the measured average voltage ($U_{avg}$) of the main current electric arc is measured once more and the process is repeated as many times as it takes, until the measured voltage (U) or the measured average voltage ($U_{avg}$) lies below the threshold voltage value ($U_s$) or until a pre-determined number of purification pulses is reached.

7. A process according to claim 6 wherein the welding process is continued, after reaching a predetermined number of purification pulses, without one of the voltage (U) and the average voltage ($U_{avg}$) of the main current electric arc, measured following the last pulse, being below the predetermined threshold voltage value ($U_s$).

8. A process according to claim 7 wherein at least one of a warning signal is generated and the welding process is recorded with an error registration.

9. A process according to claim 5 wherein a positive purification pulse is produced if a pre-set, initial main welding current (I) lies below a predetermine value, and a negative purification pulse is produced if the pre-set initial main welding current (I) lies above a pre-set value.

10. A process according to claim 5 wherein the course of the main current electric arc is corrected, depending upon the number and one of the positive and negative energy contents of the purification pulses and, optionally, in energy contents of time intervals between two purification pulses.

11. A process according to claim 10 wherein the correction is made in such manner that the total energy contents of the main current electric arc are essentially kept constant vis-a-vis an ideal welding process without purification pulses.

12. A process according to claim 11 wherein the current intensity (I) of the main current electric arc, following completion of the purification pulses, with constant duration of the main current electric arc are increased or reduced or the duration ($t_s$) of the main current electric arc with constant current intensity (I) of the main current electric arc is extended or shortened after completion of the purification pulses.

13. A process according to claim 5 wherein the main current electric arc is ignited for at least one measurement-taking of one of the measured voltage (U) and the measured average voltage ($U_{avg}$) with a constant initial current intensity (I) independent of subsequent current intensity of the main current electric arc.

14. A process according to claim 13 wherein the initial current intensity lies within the range of 100 A to 400 A.

15. A process according to claim 5 from which there is deduced from the deviation of one of the last measured voltage (U) and from the measure average voltage ($U_{avg}$) of one of an ideal voltage and from the threshold voltage ($U_s$) and from a value representing quality of the finished welding.

16. A process according to claim 15 wherein one of the value and the information pertaining to the welding, is at least one of indicated and recorded.

17. A device for drawn arc stud welding, with at least one stud welding head (5) connected to a current supply and control unit (19) and a measuring and control unit (29), which regulates or controls the welding current (I), wherein the measuring and control unit measures at least one of measured voltages (U) and a measured average voltage ($U_{avg}$) after ignition of a main current electric arc, and based on at least one of the measured voltage (U) and measured average voltage ($U_{avg}$) adjusts the continued main current electric arc.

18. A welding process for drawn arc stud welding wherein:

a) after ignition of a main current electric arc, a voltage (U) and an average voltage ($U_{avg}$) are measured and b) depending upon the measured voltage (U), at least one of the course of the current of the continued main current electric arc and the movement of parts which are to be welded, is regulated or controlled.

19. A process according to claim 18 wherein, with at least one of surpassing of and failing to meet a pre-set threshold voltage value, a pre-set course of a main welding current (I) is altered through one of the measured voltage (U) and measured average voltage ($U_{avg}$).

20. A process according to claim 19 wherein, with surpassing of a threshold voltage ($U_s$) by one of the measured voltage (U) and measured average voltage ($U_{avg}$), the main welding current (I) is superposed with a purification pulse, the purification pulse being at least one of is a positive pulse with steep pulse edges, and a negative pulse which is reduced from an initial value and is subsequently increased and, at the end of the duration of the purification pulse, is again reduced to the initial value, in order to bring about cleaning of surfaces of the parts that are to be welded together.

* * * * *